(12) United States Patent
Mitsunaga et al.

(10) Patent No.: US 8,948,826 B2
(45) Date of Patent: Feb. 3, 2015

(54) ELECTRONIC DEVICE AND INPUT INTERFACE SWITCHING METHOD

(75) Inventors: Naoki Mitsunaga, Yokohama (JP); Hitoshi Inoue, Yokohama (JP)

(73) Assignee: Kyocera Corporation, Kyoto (JP)

( * ) Notice: Subject to any disclaimer, the term of this patent is extended or adjusted under 35 U.S.C. 154(b) by 264 days.

(21) Appl. No.: 12/675,767

(22) PCT Filed: Aug. 28, 2008

(86) PCT No.: PCT/JP2008/065361
§ 371 (c)(1),
(2), (4) Date: Jun. 10, 2010

(87) PCT Pub. No.: WO2009/028585
PCT Pub. Date: Mar. 5, 2009

(65) Prior Publication Data
US 2010/0255862 A1  Oct. 7, 2010

(30) Foreign Application Priority Data

Aug. 29, 2007  (JP) ................................. 2007-222942

(51) Int. Cl.
*H04M 1/00* (2006.01)
*H04M 1/02* (2006.01)
(Continued)

(52) U.S. Cl.
CPC .......... *H04M 1/0235* (2013.01); *H04M 1/0241* (2013.01); *H04M 1/72522* (2013.01);
(Continued)

(58) Field of Classification Search
CPC .......... H04M 1/72519; H04M 1/0237; H04M 1/0214; G06F 3/0488
USPC ...................... 455/566, 575.1, 575.5; 345/173
See application file for complete search history.

(56) References Cited

U.S. PATENT DOCUMENTS 7,388,578 B2 *  6/2008  Tao ................................ 345/173
2005/0032557 A1 *  2/2005  Brunstrom et al. ........ 455/575.1
(Continued)

FOREIGN PATENT DOCUMENTS

JP   2003-319044   11/2003
JP   2005-004063   1/2005
(Continued)

OTHER PUBLICATIONS

International Search Report for PCT/JP2008/065361, mailed on Oct. 28, 2008, 1 page.

*Primary Examiner* — Wayne Cai
*Assistant Examiner* — Chuck Huynh
(74) *Attorney, Agent, or Firm* — Duane Morris LLP

(57) ABSTRACT

The electronic device according to the present invention comprises a display housing 120 having a first display unit 124, an operation housing 150 coupled to said display housing so that said operation housing is movable substantially in parallel to and relative to a surface of said display housing facing said operation housing, said operation housing having a second display unit 160 which displays an operation screen and a touch panel 162 piled on the second display unit so that the operation screen is visible, a position detection unit 156 for detecting a relative position of said display housing and said operation housing, and a control unit for deciding an application displayed on the first display unit in accordance with the relative position detected by said position detection unit, wherein said control unit switches the operation screen displayed on the second display unit in accordance with the application displayed on the first display unit.

14 Claims, 13 Drawing Sheets

(51) Int. Cl.
*H04M 1/725* (2006.01)
*G06F 3/0487* (2013.01)
*G06F 3/0362* (2013.01)
*G06F 1/16* (2006.01)

(52) U.S. Cl.
CPC ............ *G06F3/0487* (2013.01); *G06F 3/0362* (2013.01); *G06F 1/1624* (2013.01); *G06F 1/1677* (2013.01); *G06F 1/1692* (2013.01); *H04M 1/72558* (2013.01); *H04M 2250/16* (2013.01); *H04M 2250/22* (2013.01)
USPC ................. 455/575.4; 455/566; 455/575.1; 345/173

(56) References Cited

U.S. PATENT DOCUMENTS

2006/0211454 A1* 9/2006 Park et al. .................... 455/566
2007/0270107 A1* 11/2007 Vanska et al. ............... 455/90.3

FOREIGN PATENT DOCUMENTS

| JP | 2005-277468 | | 10/2005 |
|----|---|---|---|
| JP | 2005-341126 | | 12/2005 |
| JP | 2005-341480 | | 12/2005 |
| JP | 2005341480 | A * | 12/2005 |
| JP | 2006-004063 | | 1/2006 |
| JP | 2006-313197 | | 11/2006 |

* cited by examiner

FIG. 6A
FIG. 6B
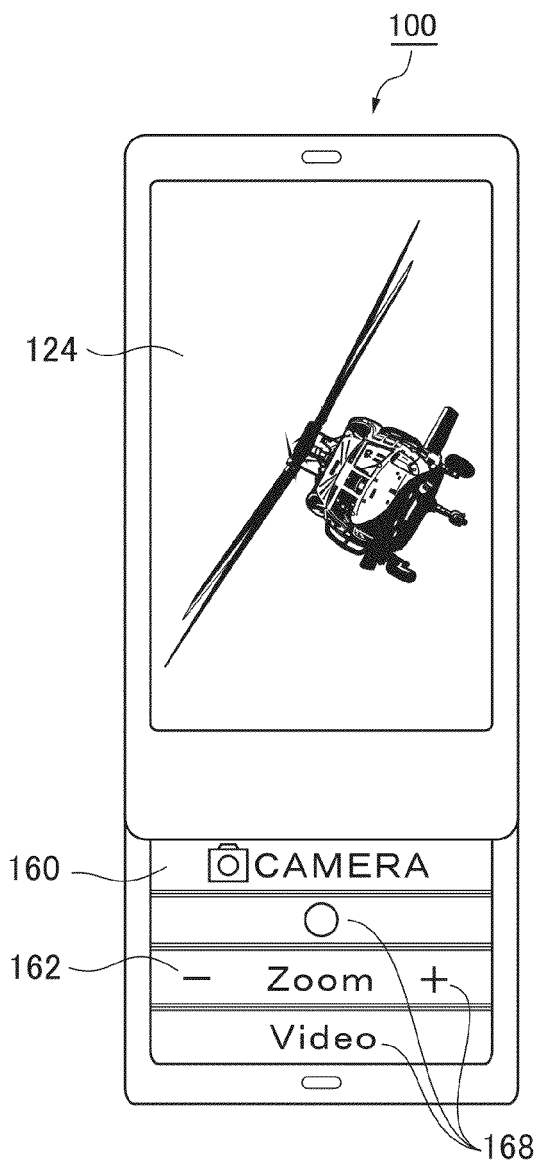
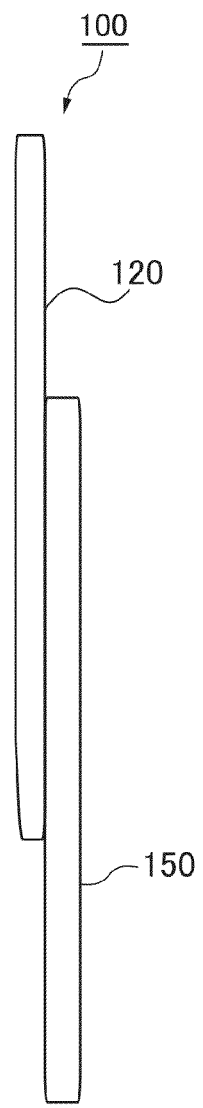

FIG. 7A
FIG. 7B
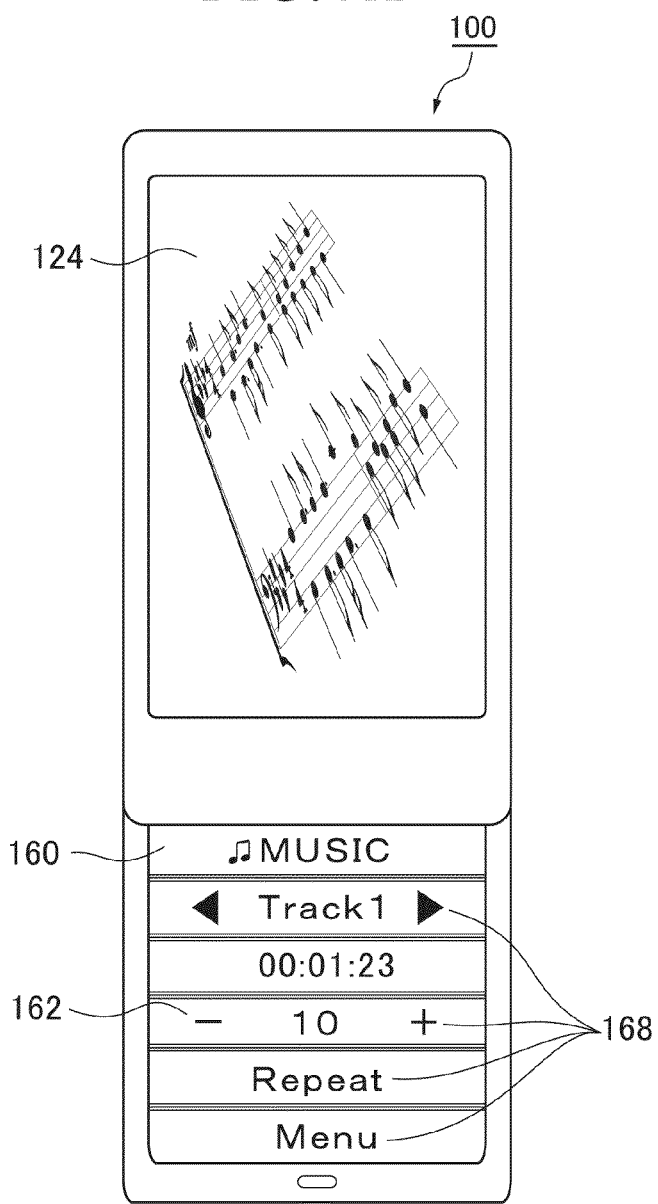
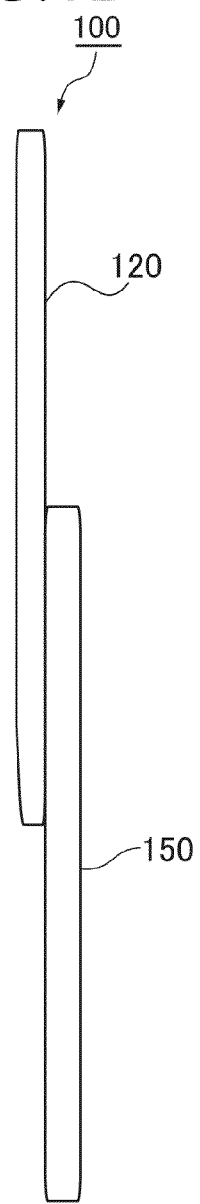

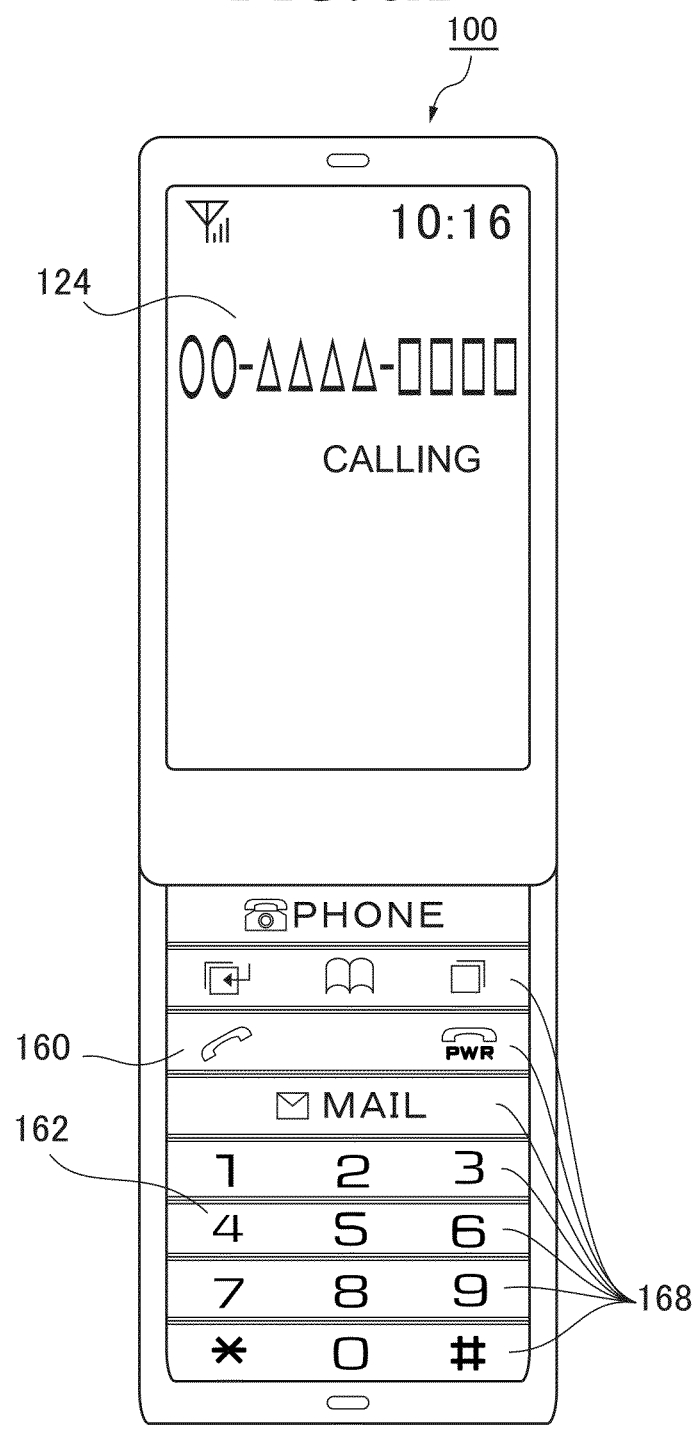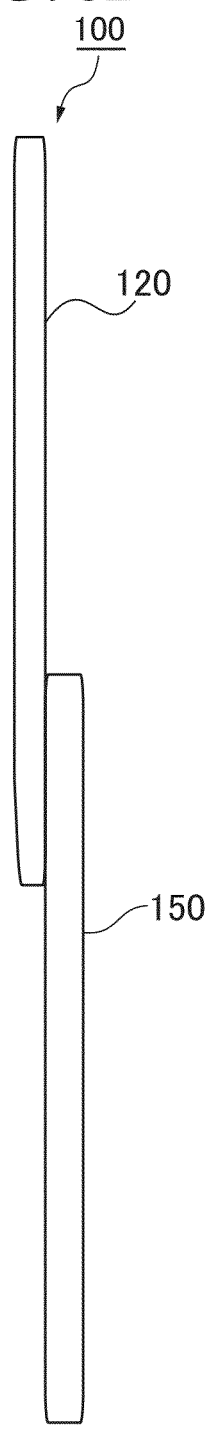

A-A SECTIONAL VIEW

ELECTRONIC DEVICE AND INPUT INTERFACE SWITCHING METHOD

CROSS-REFERENCE TO RELATED APPLICATIONS

This is a U.S. National Phase Application of International Application No. PCT/JP2008/065361 filed Aug. 28, 2008, which claims priority to Japanese Patent Application No. 2007-222942 filed Aug. 29, 2007, the disclosures of which are incorporated herein by reference in their entirety.

BACKGROUND OF THE INVENTION

The present invention relates to an electronic device in which a display housing and an operation housing are coupled so that they are movable relative to each other, and to an input interface switching method for the electronic device.

In recent years, portable terminals represented by mobile phones, PHS (Personal Handy Phone System), PDA (Personal Digital Assistant) or mobile personal computers are becoming smaller, lighter and more functionally satisfied. There are electronic devices which can have a compact form when waiting for a call and can be transformed for easy operation when they are used. Such an electronic device has, for example, a display housing and an operation housing which are coupled with a rail, hinge or bearing so that the housings can be variously transformed by sliding, folding or rotating them.

There is a known art, for such a transformable electronic device, that when an operation housing which slides relative to a display housing is stopped at a predetermined position, an imaging device such as a camera is activated automatically, as described for example in Patent Document 1. According to the art, the imaging device can be activated, not by a troublesome operation but by a simple operation i.e. sliding the housings. In addition, there is another known art, for a camera with two slidable housings, that the operation housing is protected when waiting for a call, and it is exposed by sliding it when it is used, as described for example in Patent Document 2.

Besides, there is another known art that a plurality of housing slide directions are prepared in the same device and a different application is activated in accordance with the slide direction. According to the art, for example, a television viewer is activated when a housing is slid in one direction and an imaging device is activated when the housing is slid in another direction, as described for example in Patent Document 3.

Moreover, there is another known art that a housing is provided with a plurality of independent layered operation drawers and any one of the operation drawers is derived, exposed and used selectively, as described in Patent Document 4.

Patent Document 1: Japan Laid Open Patent 2005-277468
Patent Document 2: Japan Laid Open Patent 2006-313197
Patent Document 3: Japan Laid Open Patent 2005-341480
Patent Document 4: Japan Laid Open Patent 2003-319044

According to the prior arts, an application can be automatically activated only by changing relative positions of two housings. However, since operation keys for operating the application are fixedly arranged, the function, position and number of the input interface are limited and therefore various applications cannot be utilized sufficiently.

Besides, the prior arts use fixedly arranged operation keys (fixedly arranged input interface) so that it is not possible to change the input interface for each user. Accordingly, even for a child or old people who do not need a complicated input interface, the needless operation keys cannot be eliminated. So, various input interfaces would sometimes disturb the operation of the device.

The present invention attempts to solve the above problems. The object of the present invention is to provide an electronic device and an input interface switching method, wherein usability of the device is improved by the applications which can be activated easily and rapidly and by useful input interfaces.

In order to solve the above stated problems, according to an aspect of the present invention, an electronic device comprises: a display housing having a first display unit; an operation housing coupled to said display housing so that said operation housing is movable substantially in parallel to and relative to a surface of said display facing said operation housing housing, said operation housing having a second display unit which displays an operation screen and a touch panel piled on the second display unit so that the operation screen is visible; a position detection unit for detecting a relative position of said display housing and said operation housing; and a control unit for deciding an application displayed on the first display unit in accordance with the relative position detected by said position detection unit; wherein said control unit switches the operation screen displayed on the second display unit in accordance with the application displayed on the first display unit.

When said position detection unit detects the relative position, said control unit may activate an application corresponding to the relative position and display contents of the activated application on the first display unit.

When several applications are running at the same time, said control unit may display on the first display unit contents of one of the running applications corresponding to the relative position detected by said position detection unit.

The second display unit may be arranged on the surface of said operation housing which faces said display housing.

The second display unit may display the operation screen in accordance with the relative position detected by said position detection unit, based on divided display areas which are exposed by relative movement of said display housing and said operation housing arranged in the relative movement direction of said display housing and said operation housing.

The touch panel may be formed as a form corresponding to the divided display areas.

An application may be assigned to a relative position of said display housing and said operation housing by which display areas required by the operation screen for the application are supplied in the second display unit, and said control unit may display on the first display unit contents of the application corresponding to the relative position detected by said position detection unit.

In order to solve the above stated problems, according to another aspect of the present invention, an input interface switching method used in an electronic device which comprises a display housing having a first display unit, an operation housing coupled to the display housing so that the operation housing is movable substantially in parallel to and relative to a surface of the display housing facing the operation housing, said operation housing having a second display unit which displays an operation screen and a touch panel piled on the second display unit so that the operation screen is visible, may comprise: a step for a detecting a relative position of the display housing and the operation housing; and a step for switching the operation screen displayed on the second display unit in accordance with an application decided to be displayed on the first display unit based on the detected relative position.

The structural elements and their explanations which correspond to the technological ideas in the electronic device stated above can also be applied to the input interface switching method.

EFFECTS OF THE INVENTION

According to the present invention as explained above, usability of the electronic device is improved by applications which can be activated easily and rapidly and by useful input interfaces.

BRIEF EXPLANATION OF THE DRAWINGS

FIGS. 6A and 6B are views for illustrating the appearance of the mobile phone in two-slide position.

FIGS. 7A and 7B are views for illustrating the appearance of the mobile phone in three-slide position.

FIGS. 8A and 8B are views for illustrating the appearance of the mobile phone in four-slide position (final-slide position).

Figure 1:
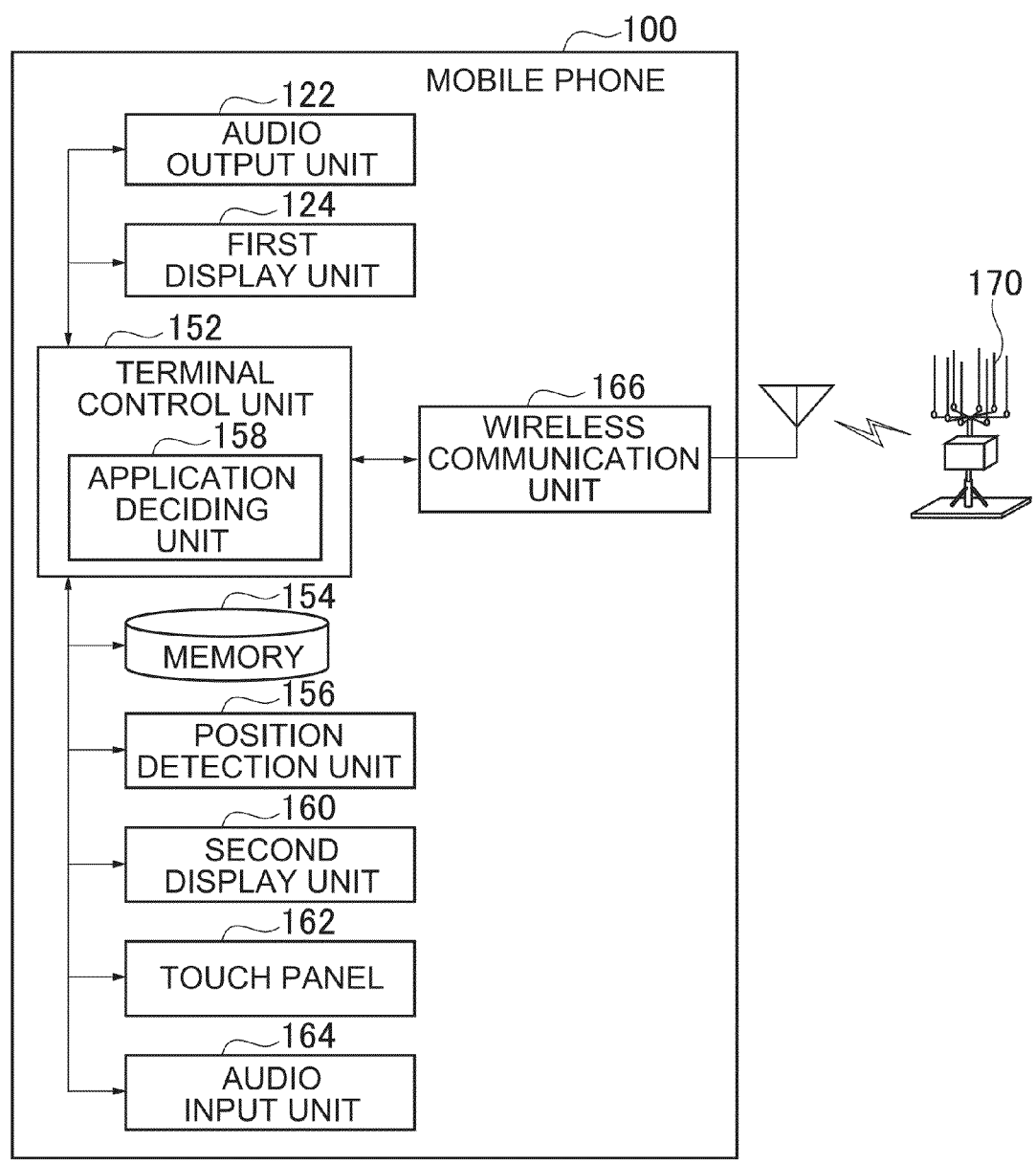
FIG. 1 is a block diagram for illustrating schematic functions of the mobile phone.

EXPLANATION OF REFERENCE NUMERALS 100 mobile phone
120 display housing
124 first display unit
150 operation housing
156 position detection unit
158 application deciding unit
160 second display unit
162 touch panel
168 operation block

BEST MODE FOR CARRYING OUT THE INVENTION

The best embodiments for realizing the present invention will be explained in detail below with reference to the accompanying drawings. In the present description and drawings, the structural elements which have essentially the same functional structure are indicated by the same reference numerals in order to omit overlapping explanations.

In order to make the present embodiment easily understood, a mobile phone is used as an electronic device. In the following, the general structure of the mobile phone of the present embodiment is explained, and then the input interface switching method for the mobile phone is explained.

Figure 2:
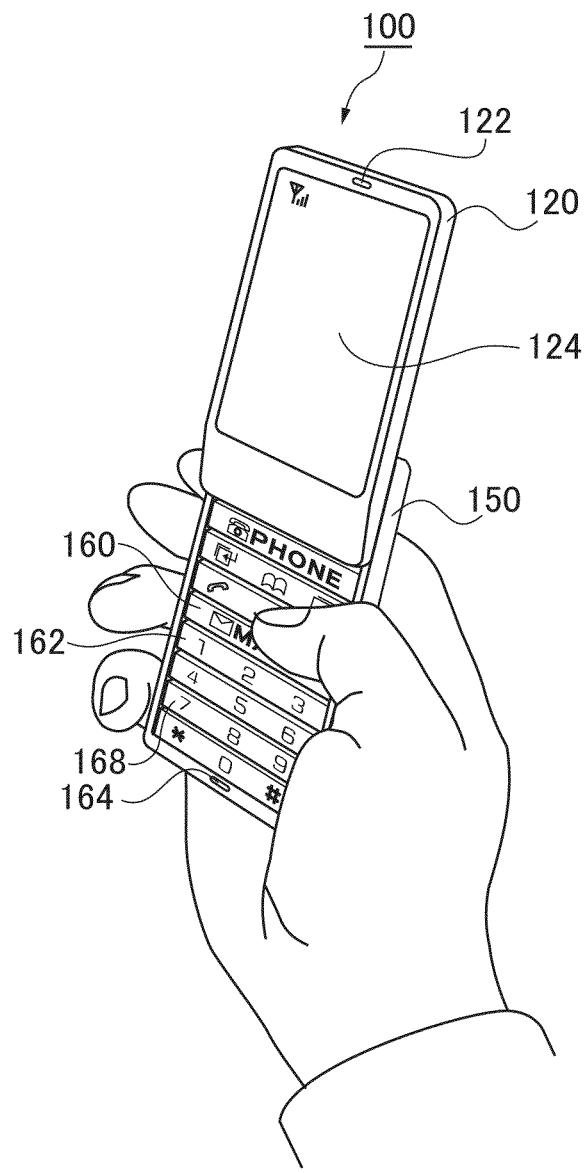
FIG. 2 is a perspective view for illustrating the schematic structure of the mobile phone.

FIG. 1 is a block diagram for illustrating schematic functions of the mobile phone 100. FIG. 2 is a perspective view for illustrating the schematic structure of the mobile phone 100. The mobile phone 100 comprises a display housing 120 and an operation housing 150 which are movable (slidable) relatively to a facing surface to the display housing 120 in substantially parallel. The display housing 120 has an audio output unit 122 and a first display unit 124. The operation housing 150 has a terminal control unit 152 for a controller, a memory 154, a position detection unit 156, an application deciding unit 158, a second display unit 160, a touch panel 162, an audio input unit 164 and a wireless communication unit 166.

The audio output unit 122 includes a speaker. The unit 122 converts a call partner's audio signal received by the mobile phone 100 to sound and outputs the sound. The audio output unit 122 can also output a call sound, an operation sound of the input interface comprised of the second display unit 160 and the touch panel 162 and an alarm sound etc.

The first display unit 124 is made of a color or monochrome liquid crystal display or of an Organic Electro Luminescence display etc. The first display unit 124 displays a GUI (Graphical User Interface) of an applications such as Web content or a scheduler which are stored in the memory 154 in the mobile phone 100 or supplied via communication network from an application relay server (not shown in the drawings).

The terminal control unit 152 is made of integrated circuits including a Central Processing Unit (CPU). The terminal control unit 152 manages and controls the whole mobile phone 100. The terminal control unit 152 uses programs stored in the memory 154 to execute various applications run on the mobile phone 100, such as a calling program, a character inputting program, a sound player, an imaging program, a TV viewer, a Web browser etc.

The memory 154 can be comprised of ROM, RAM, E2PROM, non-volatile RAM, a flash memory and HDD and stores programs and data files processed by the terminal control unit 152.

The position detection unit 156 is made of a magnetic sensor and detects a relative position of the display housing 120 and the operation housing 150. The mobile phone 100 according to the present embodiment has the display housing 120 and the operation housing 150 which slide step by step. So, the position detection unit 156 has to detect only discrete sliding positions and therefore does not have to have a high resolution. The position detection unit 156 may therefore use a small and inexpensive sensor. The position detection unit 156 may be made of, instead of a magnetic sensor, a photo sensor or a physical switch. As explained below, the present embodiment uses a four-step sliding structure.

The application deciding unit 158 decides an application to be activated in accordance with the relative position of the display housing 120 and the operation housing 150 detected by the position detection unit 156. In other words, applications correspond to the relative positions of the display housing 120 and the operation housing 150 beforehand. When both of the housings are slid and the relative position thereof is changed, an application corresponding to the changed relative position is activated. The mobile phone 100 can also run several applications at the same time. In this case, the mobile phone 100 displays one of the several running applications on the first display unit 124. The application deciding unit 158 switches the several running applications to be displayed on the first display unit 124.

When the display housing 120 and the operation housing 150 are slid to a relative position, the application deciding unit 158 measures the time for which both of the housings keep a stationary state at the relative position. If the unit 158 senses that both of the housings keep the stationary state for a predetermined time or more, it activates an application corresponding to the relative position. In this way, even when the display housing 120 and the operation housing 150 are slid to a sliding position for activating a desired application by way of another sliding position for activating another application, it is possible to prevent the another application from being activated.

The second display unit 160 is made of a color or monochrome liquid crystal display or of an Organic Electro Luminescence display etc. The second display unit 160 displays operation keys for receiving user's input. The touch panel 162 is arranged on the surface of the second display unit 160. The touch panel 162 is touched by a user's finger etc. and receives input to an operation key displayed at the position touched by the user on the second display unit 160. That is to say, the second display unit 160 and the touch panel 162 constitute an input interface.

The input interface displayed on the second display unit 160 and on the touch panel 162 can have any type of operation keys of any arrangement in order to receive inputs corresponding to the arrangement. So, the type and arrangement of the operation keys in the input interface can be changed for each application decided by the application deciding unit 158, and make the application so easy to handle.

Accordingly, when the application deciding unit 158 selects, for example, a digital camera as an application to be activated (or as an application to be displayed on the first display unit 124, selected from several applications being activated at the same time), the mobile phone 100 displays on the second display unit 160 operation keys such as "shutter" and "zoom" in order to prepare an input interface exclusively for the digital camera. When the application deciding unit 158 selects a calling program, the mobile phone 100 changes operation keys displayed on the second display unit 160 to a ten key, a calling key and a call termination key in order to prepare another input interface exclusively for the calling program.

As above, the mobile phone 100 provides input interfaces suitable respectively for several applications.

The touch panel 162 may use, for sensing a touch, various methods using a resistance film, electrostatic capacity, ultrasonic surface acoustic wave, infrared light shield or image recognition.

The audio input unit 164 is made of a sound recognition device such as a microphone. It converts a voice of a user input during a call to electric signal which can be processed in the mobile phone 100.

The wireless communication unit 166 executes wireless communication with the base station 170 by way of the mobile phone network. For such wireless communication protocol, there is a time division multiple access (TDMA) method which executes communication so that a plurality of time slots are created by dividing frames by time at the base station 120 are allotted to respective channels of the mobile phone 100.

FIG. 3 are views for illustrating a relationship between two housings' relative positions and corresponding applications to be activated. The open/close position of the slidable mobile phone 100 is changed by relative shifting (sliding) the display housing 120 and the operation housing 150 substantially in parallel to facing surface. The second display unit 160 is formed on the surface which is exposed when the display housing 120 and the operation housing 150 are in the open position. Accordingly, when they are in the close position, the second display unit 160 is covered by the display housing 120. The second display unit 160 displays the operation screen on its whole surface.

Figure 3A:
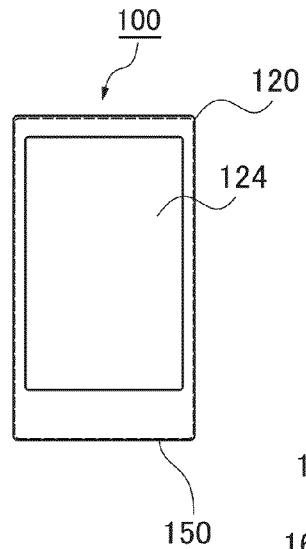
FIGS. 3A to 3E are views for illustrating a relationship between two housings' relative positions and corresponding applications to be activated.
Figure 3B:
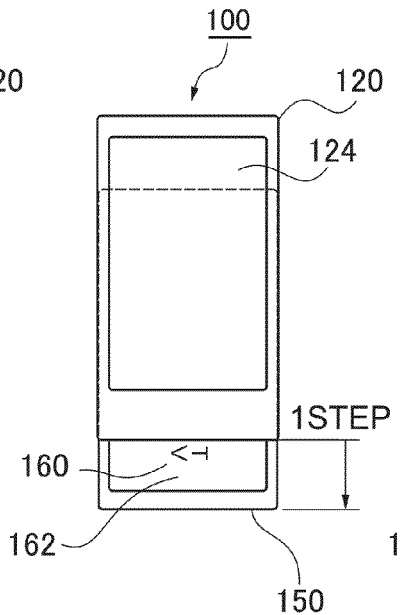
Figure 3C:
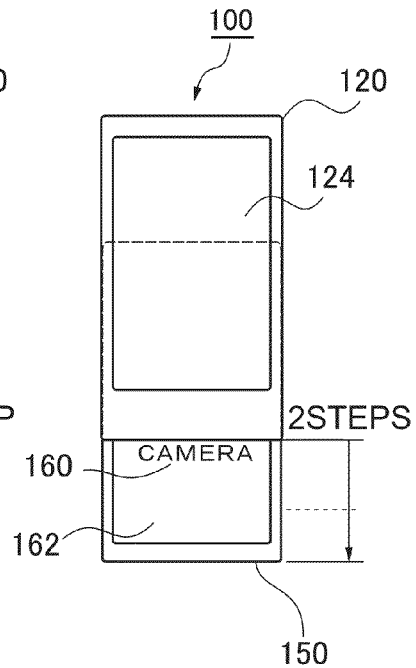
Figure 3D:
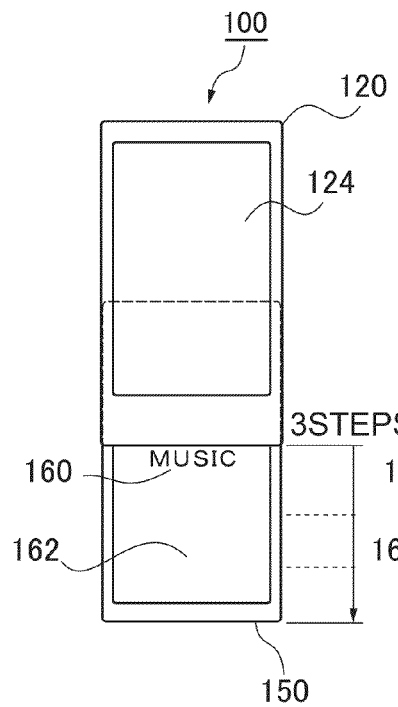
Figure 3E:
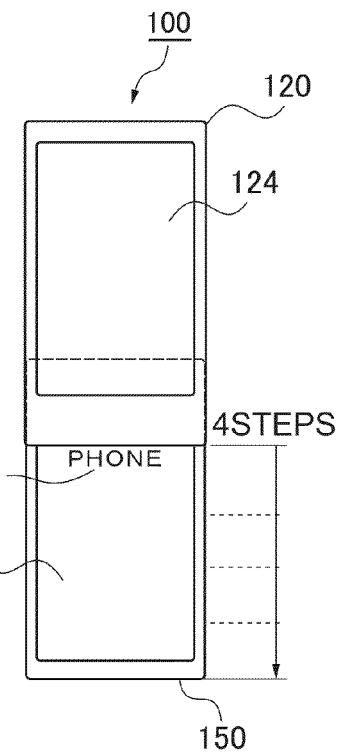

For example, the close position is defined as the position of the closed slidable mobile phone 100 illustrated in FIG. 3A. In addition, there are one-slide position of FIG. 3B assigned to the TV viewer, two-slide position of FIG. 3C assigned to the imaging program, three-slide position of FIG. 3D assigned to the sound player and final-slide position of FIG. 3E assigned to the character inputting program for the calling program, an electronic mailer or a scheduler.

As above, relative positions (sliding positions) of the display housing 120 and the operation housing 150 correspond to applications to be activated. Therefore, a user can easily know, from the appearance of the mobile phone 100, which application is currently activated. Therefore, a user can recognize, from the relative position of both of the housings, that a desired application is activated, without referring to the contents displayed on the first display unit 124.

Some applications can decide their own termination timings. When applications such as a TV viewer or a sound player is used, a user may prefer to display the application different ways, for example in a compact size, and keep running it after activation of it. When running such an application, the application once activated is kept being run until the user terminates the application, regardless of the sliding position of the display housing 120 and the operation housing 150. In this way, the user can keep an application being run intentionally, regardless of the sliding position of the display housing 120 and the operation housing 150.

Figure 4A:
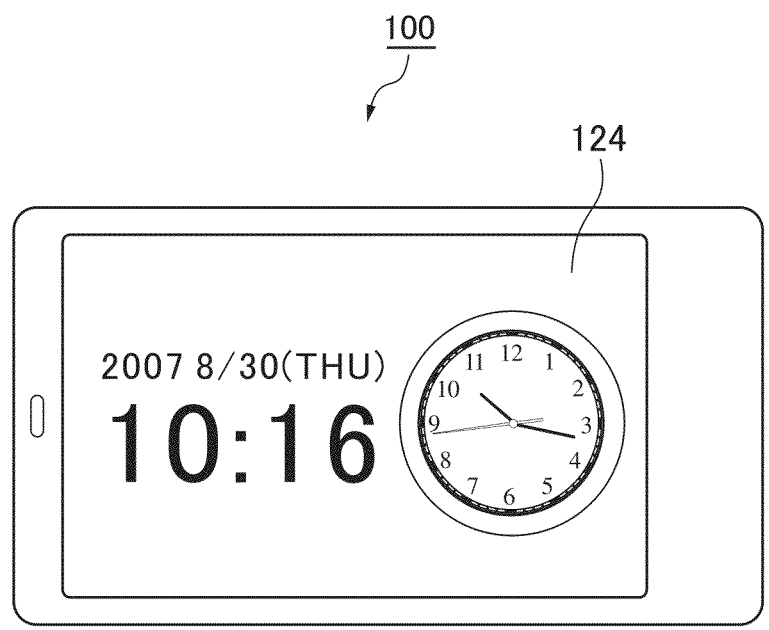
FIGS. 4A and 4B are views for illustrating the appearance of the mobile phone in the close position.
Figure 4B:
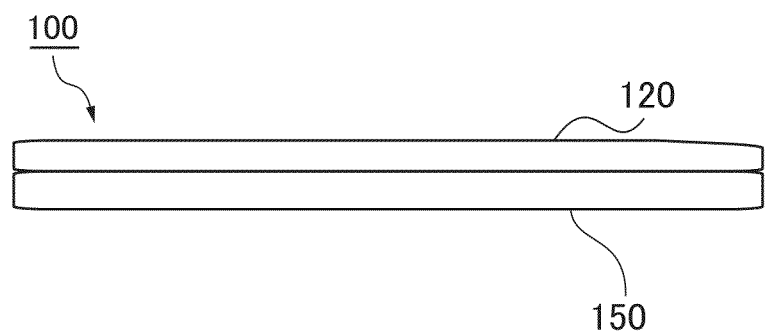

FIG. 4 are views for illustrating the appearance of the mobile phone 100 in the close position. The display housing 120 and the operation housing 150 are completely overlapped and therefore the second display unit 160 and the touch panel 162 are not exposed. So, operation of the mobile phone 100 can be limited. In the close condition of FIG. 4, the first display unit 124 displays a wall paper such as a calendar or a clock and displays phone number or registered name of a call partner when receiving a call.

Figure 5A:
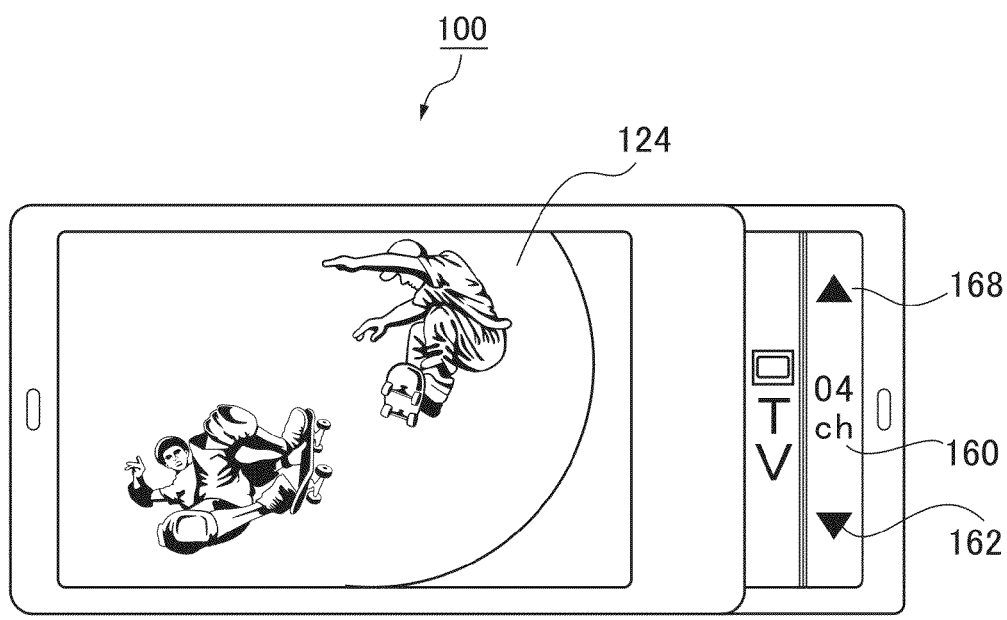
FIGS. 5A and 5B are views for illustrating the appearance of the mobile phone in one-slide position.
Figure 5B:
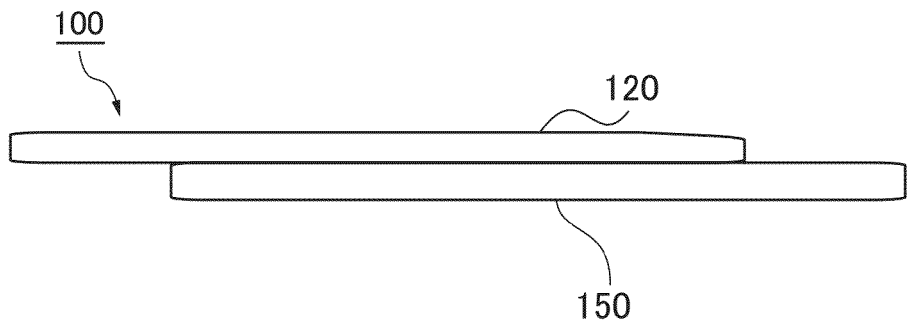

FIGS. 5A and 5B are views for illustrating the appearance of the mobile phone 100 in one-slide position. As shown in those drawings, a part of the operation housing 150 is exposed and a TV viewer is activated. Then, the second display unit 160 displays an operation block 168 including one or more operation keys for changing channels. A user may select a TV channel by touching either one of the operation keys, in the operation block 168, on which triangles indicate right and left sides.

FIG. 6 are views for illustrating the appearance of the mobile phone 100 in two-slide position. As shown in those drawings, an exposed area of the operation housing 150 is expanded and imaging program is activated. Then, on the second display unit 160, operation blocks 168 are displayed. The operation blocks 168 include operation keys such as a shutter key indicated by a circle, a zoom key indicated by marks "+" and "−" and a video switch key. A user may touch the operation key "+" or "−" of the operation blocks 168 in order to zoom in or zoom out an image to be obtained, may touch the operation key indicated by a circle in order to carry out imaging, and may touch the operation key "video" in order to select video imaging mode.

FIG. 7 are views for illustrating the appearance of the mobile phone 100 in three-slide position. As shown in those drawings, an exposed area of the operation housing 150 is further expanded and a sound player is activated. Then, on the second display unit 160, operation blocks 168 are displayed. The operation blocks 168 include operation keys such as a track change key, a volume adjustment key, a repeat playing key "Repeat" a menu image displaying key "Menu." A user may touch the operation key "▲" or "▼" of the operation blocks 168 in order to select a track to be played, may touch the operation key "+" or "−" in order to adjust the volume.

FIG. 8 are views for illustrating the appearance of the mobile phone 100 in four-slide position (final-slide position). As shown in those drawings, an exposed area of the operation housing 150 is furthest expanded and calling function and character inputting function can be executed. A user may touch the ten key and full key displayed on the second display unit 160 in order to input the phone number of a call partner or other characters. As well as an ordinary mobile phone, one or more characters are assigned to each numeral of ten key of the second display unit 160 illustrated in FIG. 8A. A user can input characters by selecting and changing the assigned characters.

The operation blocks 168 are, in the second display unit 160, arranged regularly to some extent. For example, an exposed part of the second display unit 160 is divided into equal-sized areas arranged along the sliding direction (relative movement direction) of the display housing 120 and the operation housing 150. Each divided area is a single operation block 168 to which an operation key is assigned. For instance, as shown in FIG. 5A, the up/down keys (two opposite triangle keys in the drawing) for switching TV channels are arranged respectively at the both ends of a single operation block 168. As shown in FIG. 7A, the operation keys for selecting a track to be played (two opposite triangle keys in the drawing) are arranged respectively at the both ends of a single operation block 168. The operation keys "+" and "−" are arranged respectively at the both ends of another single operation block 168.

In the present embodiment, as shown in FIGS. 4 to 8, every sliding step of the display housing 120 and the operation housing 150 increases or decreases two operation blocks. However, the number of operation block is changed not only by this manner. Every sliding step of both of the housings may increase or decrease one or three operation block(s).

As above, by assigning operation blocks, each of which is a unit of display area for displaying the operation keys, to each application in common, those operation blocks become a guide for inputting areas. Therefore, a feeling of wrongness by changing the operation keys for each application given to a user is reduced and a feeling of comfortableness can be given to the user.

In the present embodiment, the display of the operation block(s) 168 on the second display unit 160 is changed in accordance with the detection of a touch on a position in the touch panel 162 corresponding to the operation blocks 168. Therefore, for example, as shown in FIGS. 4A to 8B, it is possible to carry out predetermined functions even in the case that the effective area of the input interface is changed, and the function, arrangement and number of the operation blocks 168 are changed.

By sliding the display housing 120 and the operation housing 150, the effective area of the input interface is increased or decreased. So, it is preferable to assign an application to each relative position by taking account of the number of operation blocks required for each application, so that an appropriate number of operation blocks 168 are assigned to each application.

The touch panel 162 may have a mechanical structure such as grooves, in accordance with the operation blocks 168 regularly arranged on the second display unit 160.

Figure 9A:
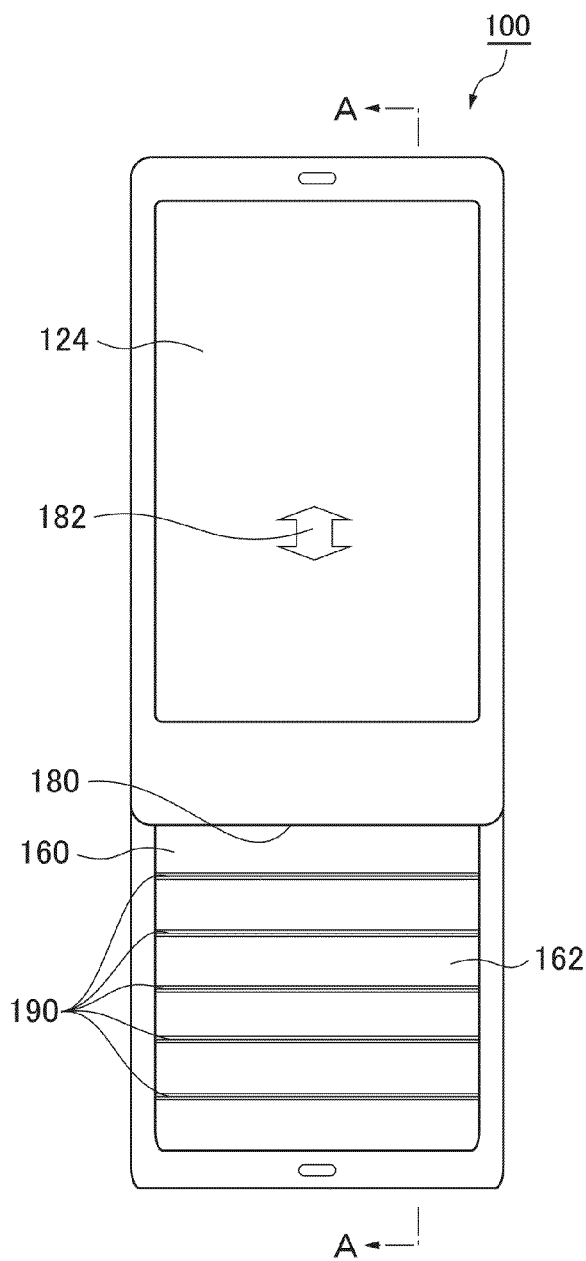
FIGS. 9A and 9B are views for illustrating the form of the touch panel.
Figure 9B:
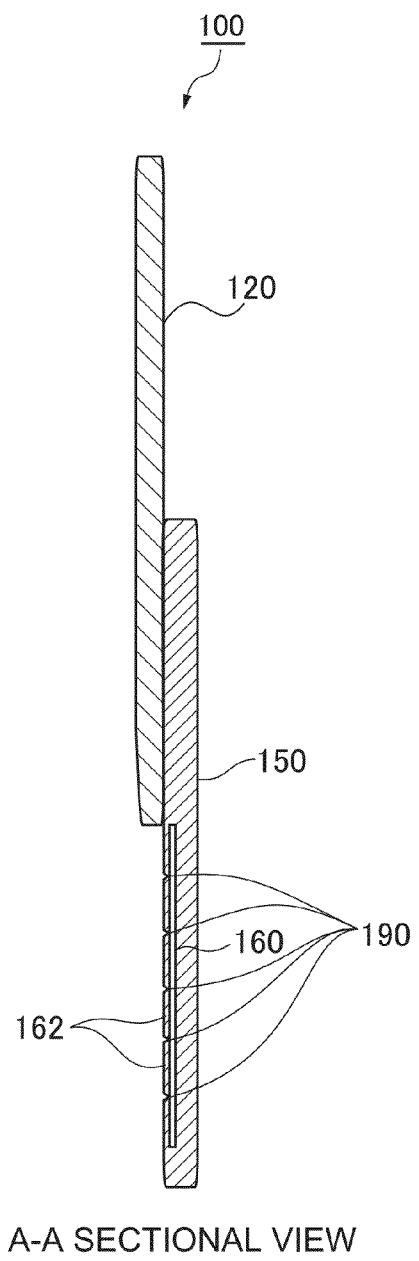

FIG. 9 are views for illustrating the form of the touch panel 162. As shown in the front view of FIG. 9A, the slidable mobile phone 100 of the present embodiment is provided with grooves 190 formed on the touch panel 162 of the operation housing 150 at the positions corresponding to application-switching positions of the edge 180 of the display housing 120. Areas of the touch panel 162 corresponding to the operation blocks 168 between the grooves 190 are formed as protrusions to which the operation keys are assigned. Therefore, as shown in A-A sectional view of FIG. 9B, the touch panel 162 is provided with regular forms corresponding respectively to the relative positions i.e. a plurality of trapezoidal forms arranged in the relative movement direction 182. In order to enable a user to touch the operation blocks easily, the grooves 190 should have not so short but appropriate distance therebetween.

According to the above structure, the regular arrangement of the operation blocks 168 is more clearly defined so that a user can grasp the functions and positions of the operation blocks 168 rapidly and can have comfortableness.

If it were difficult to form the touch panel 162 itself as the above-mentioned repeated regular form, a plastic formed as the repeated regular form may be applied to the touch panel 162 in order to the same structure.

By combining the above-mentioned second display unit 160 and the touch panel 162, it is possible to form various operation blocks 168. As a further advantage of the above combination, it enables a user to change (customize) the predetermined functions and arrangement of the operation blocks 168. For example, a user can decide the correspondence of the relative positions of the display housing 120 and the operation housing 150 to applications as desired. The user also can decide the functions and arrangement of the operation blocks 168 for each application as desired.

Figure 10A:
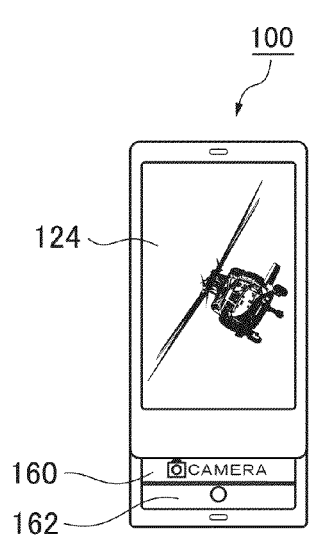
FIGS. 10A and 10B are views for illustrating an arrangement variation wherein the activating positions for TV viewer and imaging program are changed.
Figure 10B:
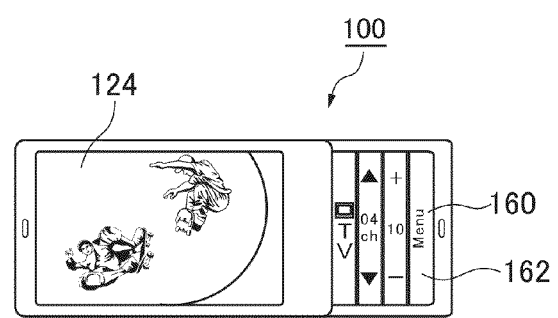

FIG. 10 are views for illustrating an arrangement variation of the operation blocks 168 wherein the activating positions for the TV viewer and the imaging program shown in FIGS. 5 to 6 are changed. In this case, as shown in FIG. 10A, one-slide relative position is assigned to the imaging program and as shown in FIG. 10B, two-slide relative position is assigned to the TV viewer.

Besides, it is possible to decide an arrangement of the operation keys specific to each user. For example, for a child or old people who do not need a complicated input interface, the needless operation keys can be eliminated and only operation keys easy to operate can remain.

Figure 11A:
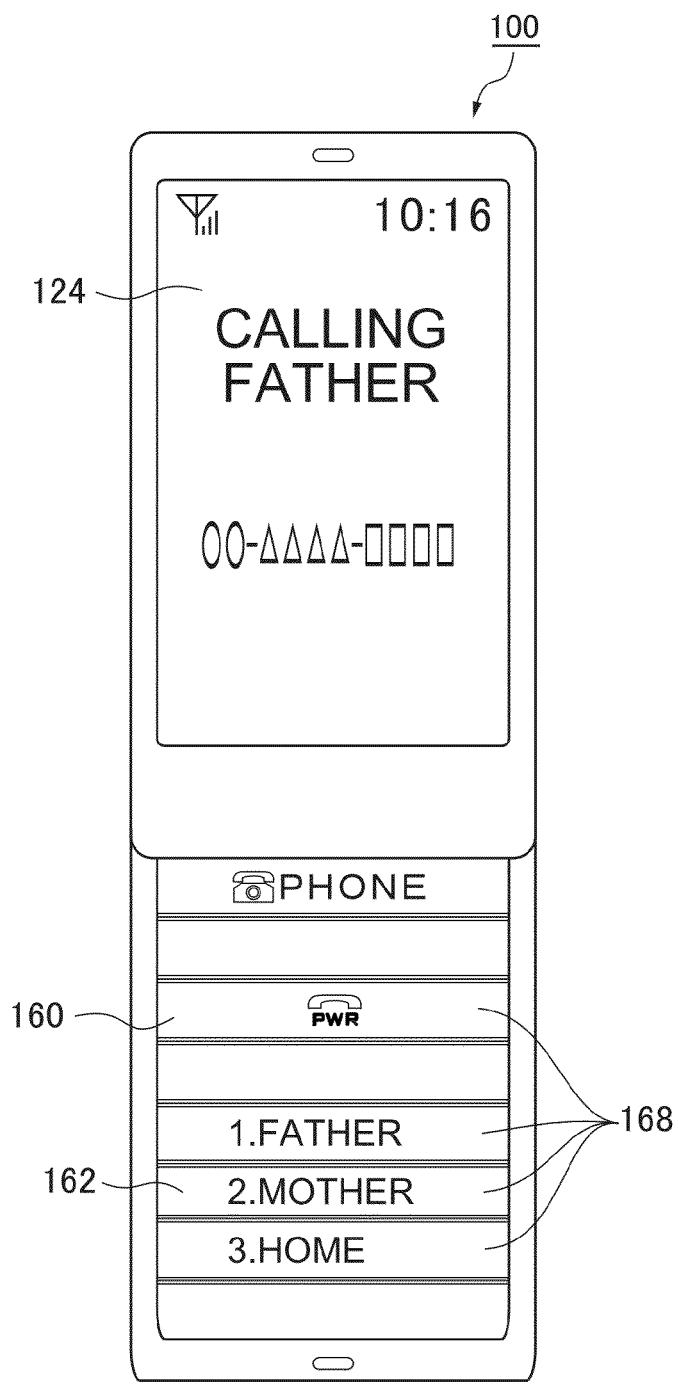
FIGS. 11A and 11B are views for illustrating a simple arrangement of the operation keys.
Figure 11B:
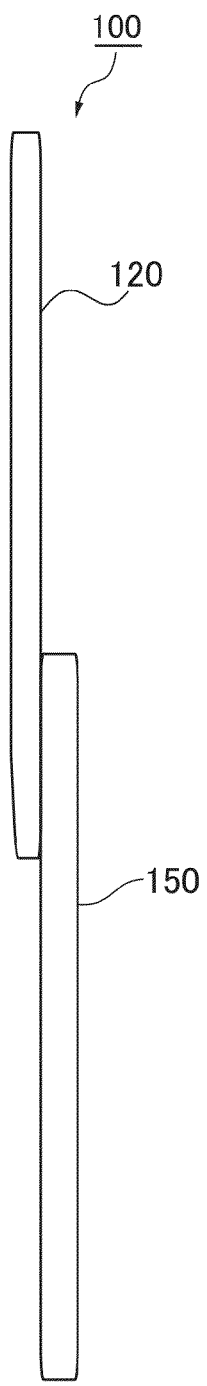

FIG. 11 are views for illustrating a simple arrangement of the operation keys. In the drawings, calling program illustrated in FIGS. 8A and 8B is used so that each single operation key is assigned to each single operation block 168. That is to say, there are speed dial keys for desired calling partners ("1. FATHER," "2. MOTHER," and "3. HOME") and call termination key (PWR), and each key is assigned to a single operation block. Only by seeing such calling partners displayed on the second display unit 160 and touching the positions thereof, a user can easily and rapidly call a desired calling partner.

According to the customized arrangement of the operation keys stated above, a user can arrange an operation block 168 for preventing crimes in position and size easy to push. A user also can arrange the operation keys easy to operate for both a right-handed person and a left-handed person. So, it is possible to customize the mobile phone 100 for really ideal operation and the usability of the mobile phone 100 is further improved.

In this context, each operation block 168 is customized manually. However, appropriate keys may also be assigned to the operation blocks 168 beforehand in order to prepare several modes such as junior and senior modes for possible users.
(Input Interface Switching Method)

In the following, an input interface switching method is explained. The method is used in the mobile phone 100 comprised of the display housing 120 having the above-stated first display unit 124 and of the operation housing 150 having the second display unit 160 and the touch panel 162.

Figure 12:
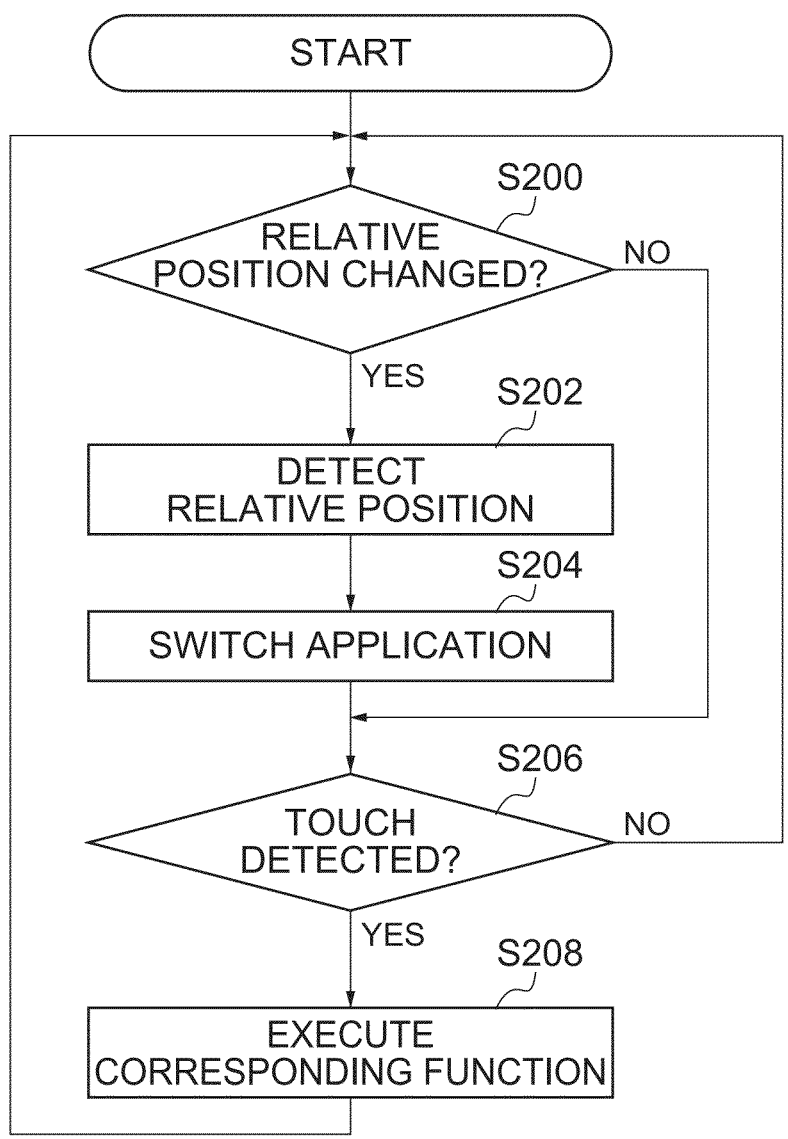
FIG. 12 is a flowchart for illustrating the input interface switching method in detail.

FIG. 12 is a flowchart for illustrating the input interface switching method in detail. According to the input interface switching method, when a user slides the mobile phone 100 so that the relative position is changed (step S200), the position detection unit 156 detects the relative position of the display housing 120 and the operation housing 150 (step S202). In accordance with the detected relative position, an application and the function of arrangement of the operation blocks 168 displayed on the operation screen is switched (step S204).

When it is detected that the user touches a position of the touch panel 162 over an operation block 168 (step S206), the switched application executes a function corresponding to the operating block 168 (step S208). By repeating such a step for detecting the relative position (step S202) and a step for executing the corresponding function (step S208), desired functions can be performed.

In the case of the above-stated embodiment, even if the number of functions is increased, it is possible to keep the portability of the mobile phone by maintaining the area for the second display unit 160 and the touch panel 162. It is also possible to improve the usability of the mobile phone by providing a number of functions which can be activated easily and rapidly and useful input interface. Besides, since only indispensable operation blocks 168 have to be prepared for each application, the area for the second display unit 160 can be reduced. It would be an advantage when making a more compact and lighter portable terminal in the future.

Although the present invention has been described with reference to the preferred embodiments while referring to the accompanying drawings, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

For example, in the embodiment described above, a slidable electronic device is explained. However, the invention is not limited to the embodiment, but can be applied to other various electronic devices transformed for example by folding or rotating the housings. The second display unit may display the operation blocks in accordance with the relative movement.

Figure 13A:
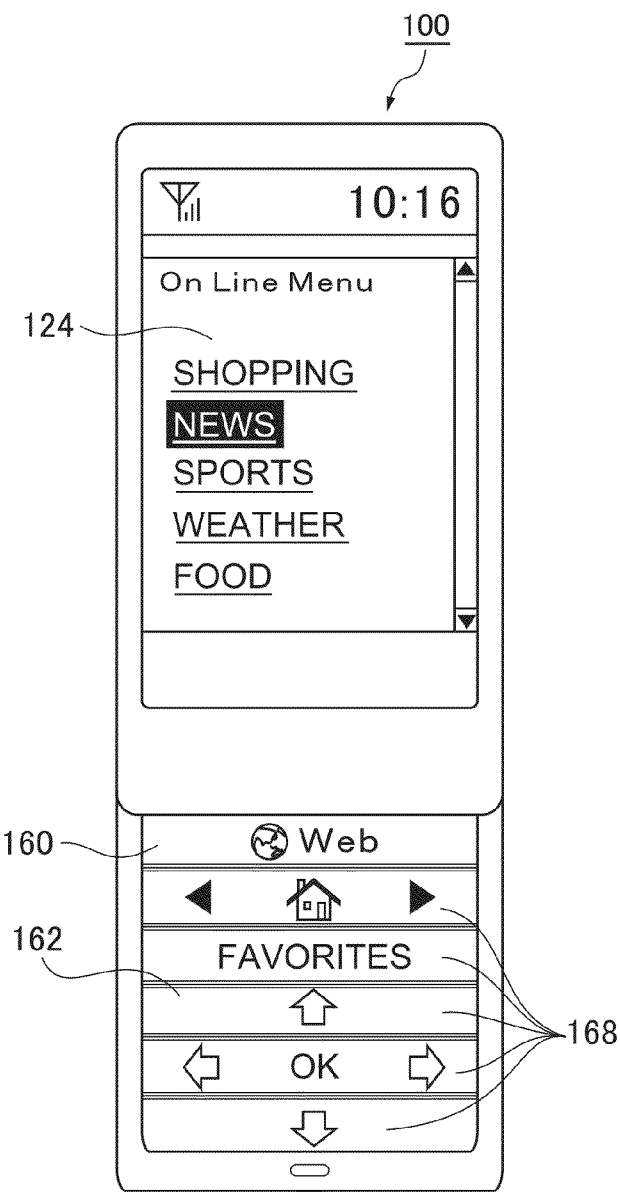
FIGS. 13A and 13B are views for showing a variation of the mobile phone in the three-slide position.
Figure 13B:
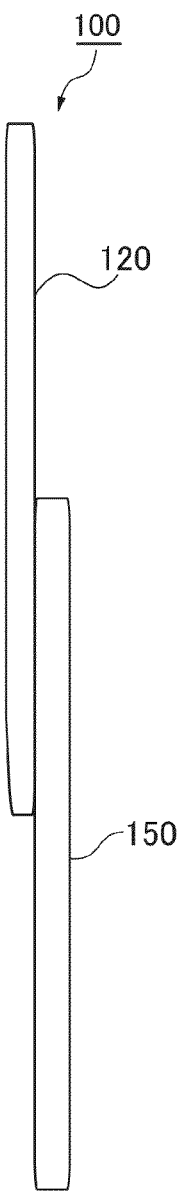

In addition, the applications activated by sliding the housings are not only those of the above-stated embodiment but may be other various applications. For example, FIG. 13 are views for showing a variation of the mobile phone 100 of FIG. 7 in the three-slide position. In FIG. 13, Web browser is activated at the three-slide position. The second display unit 160 displays operation blocks 168 for transferring between Web sites, displaying favorite Web sites, moving the cursor and making a decision. A user touches the right and left triangles on a operation block 168 in order to transfer from one Web site to another, and touches arrows at the four corners in order to move the cursor.

Furthermore, each process in the input interface switching method of the present description does not have to be performed in a chronological order according to the order described in the flow chart. The processes may also be performed in parallel or by a subroutine.

INDUSTRIAL APPLICATION OF THE INVENTION

The present invention can be applied to an electronic device in which a display housing and an operation housing are coupled so that they are movable relative to each other, and to an input interface switching method for the electronic device.

What is claimed is:

1. An electronic device comprising:
   a display housing having a first display unit;
   an operation housing coupled to said display housing so that said operation housing is movable relatively to a facing surface of said display housing, said operation housing having a second display unit which displays an operation screen and a touch panel piled on the second display unit so that the operation screen is visible;
   a position detection unit for detecting a relative position of said display housing and said operation housing; and
   a control unit for deciding an application displayed on the first display unit in accordance with the relative position detected by said position detection unit; wherein said control unit switches the operation screen displayed on the second display unit to provide an operation block including one or more operation keys associated with the application displayed on the first display unit, and increases the number and changes the type of operation blocks displayed on a touch panel display of the second display unit as the visible surface area of the second display unit increases as the relative position of said display housing and said operation housing changes, wherein when at least two applications are running at the same time, the control unit switches a display between the at least two applications in response to a sliding of the display housing relative to the operation housing between at least two predetermined relative positions.

2. The electronic device according to claim 1, wherein when said position detection unit detects the relative position, said control unit activates an application corresponding to the relative position and displays contents of the activated application on the first display unit.

3. The electronic device according to claim 2, wherein the second display unit is arranged on the surface of said operation housing which faces said display housing.

4. The electronic device according to claim 1, wherein the second display unit is arranged on the surface of said operation housing which faces said display housing.

5. The electronic device according to claim 2, wherein an application is assigned to one of a plurality of relative positions of said operation housing and said display housing provides a correspondingly sized display area required for the display of the operation screen of the application in the second display unit, and said control unit displays contents of the application corresponding to the relative position detected by said position detection unit on the first display unit.

6. The electronic device according to claim 1, wherein an application is assigned to one of a plurality of relative positions of said operation housing and said display housing provides a correspondingly sized display area required for the display of the operation screen of the application in the second display unit, and said control unit displays contents of the application corresponding to the relative position detected by said position detection unit on the first display unit.

7. The electronic device according to claim 1, wherein the second display unit is arranged on the surface of said operation housing which faces said display housing.

8. The electronic device according to claim 7, wherein an application is assigned to one of a plurality of relative positions of said operation housing and said display housing provides a correspondingly sized display area required for the display of the operation screen of the application in the second display unit, and said control unit displays contents of the application corresponding to the relative position detected by said position detection unit on the first display unit.

9. The electronic device according to claim 1, wherein the second display unit displays the operation screen in accordance with the relative position detected by said position detection unit, based on a display areas which are exposed by relative movement of said display housing and said operation housing, and divided in the relative movement direction of said display housing and said operation housing.

10. The electronic device according to claim 9, wherein the touch panel is formed as a form corresponding to the divided display areas.

11. The electronic device according to claim 10, wherein an application is assigned to one of a plurality of relative positions of said operation housing and said display housing provides a correspondingly sized display area required for the display of the operation screen of the application in the second display unit, and said control unit displays contents of the application corresponding to the relative position detected by said position detection unit on the first display unit.

12. The electronic device according to claim 9, wherein an application is assigned to one of a plurality of relative positions of said operation housing and said display housing provides a correspondingly sized display area required for the display of the operation screen of the application in the second display unit, and said control unit displays contents of the application corresponding to the relative position detected by said position detection unit on the first display unit.

13. The electronic device according to claim 1, wherein an application is assigned to one of a plurality of relative positions of said operation housing and said display housing provides a correspondingly sized display area required for the display of the operation screen of the application in the second display unit, and said control unit displays contents of the application corresponding to the relative position detected by said position detection unit on the first display unit.

14. An input interface switching method used in an electronic device which comprises a display housing having a first display unit, an operation housing coupled to the display housing so that the operation housing is movable relatively to a facing surface to said display housing, said operation housing having a second display unit which displays an operation screen and a touch panel piled on the second display unit so that the operation screen is visible, the method comprising:
  automatically detecting a relative position of the display housing and the operation housing;
  automatically switching the operation screen displayed on the second display unit to provide an operation block including one or more operation keys associated with an application decided to be displayed on the first display unit based on the detected relative position;
  automatically increasing the number and changing the type of operation blocks displayed on a touch panel display of the second display unit as the visible surface area of the second display unit increases as the relative position of said display housing and said operation housing changes; and
  when at least two applications are running at the same time, switching a display between the at least two applications in response to a sliding of the display housing relative to the operation housing between at least two predetermined relative positions.

\* \* \* \* \*